(12) United States Patent
Kouta (10) Patent No.: US 6,647,196 B1
(45) Date of Patent: *Nov. 11, 2003

(54) OPTICAL DEVICE HAVING OPTICAL WAVE GUIDE PRODUCED IN THE PRESENCE OF ACOUSTIC STANDING WAVE

(75) Inventor: Hikaru Kouta, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/207,507

(22) Filed: Dec. 9, 1998

Related U.S. Application Data (63) Continuation of application No. 08/833,253, filed on Apr. 4, 1997, now Pat. No. 5,949,572.

(30) Foreign Application Priority Data

Apr. 4, 1996 (JP) .............................................. 8-82261

(51) Int. Cl.[7] .............................. G02B 6/10; G02F 1/33
(52) U.S. Cl. ........................ 385/129; 359/285; 359/305
(58) Field of Search .................... 385/129; 359/305, 359/285; 372/18, 22, 34, 99

(56) References Cited

U.S. PATENT DOCUMENTS

| | | | | |
|---|---|---|---|---|
| 3,947,780 A | * | 3/1976 | Rice et al. | 331/94.5 M |
| 3,958,863 A | * | 5/1976 | Isaacs et al. | 350/161 |
| 3,964,825 A | * | 6/1976 | Eschler | 350/161 |
| 4,354,735 A | * | 10/1982 | Stowe et al. | 350/96.29 |
| 4,460,250 A | * | 7/1984 | Freyre et al. | 350/358 |
| 4,771,231 A | * | 9/1988 | Cross | 324/77 K |
| 5,384,799 A | * | 1/1995 | Osterwalder | 372/32 |
| 5,696,628 A | * | 12/1997 | Sutton et al. | 359/566 |
| 5,890,789 A | * | 4/1999 | Inagaki et al. | 359/305 |
| 5,949,572 A | * | 9/1999 | Kouta | 359/305 |

FOREIGN PATENT DOCUMENTS

| | | |
|---|---|---|
| JP | 62-257133 | 11/1987 |
| JP | 50-143547 | 11/1995 |

OTHER PUBLICATIONS

Amnon Yariv, "Fundamentals of Electro–optics", Maruzen Corporation—Publisher, pp. 330 with partial translation.

D. Pelenc et al., "High slope efficiency and low threshold in a diode–pumped epitaxially grown Yb: YAG waveguide laser", Optics Communications, vol. 115, 1995, pp. 491–497.

Crystal Physics and Engineering, Tomoya Ogawa, pp. 238–241 with partial translation.

* cited by examiner

Primary Examiner—Frank G. Font
Assistant Examiner—Michael P Mooney
(74) Attorney, Agent, or Firm—Sughrue Mion, PLLC (57) ABSTRACT

An electro-acoustic transducer is attached to a block of optical material, and forms an acoustic standing wave in the block; the acoustic standing wave periodically changes the refractive index of the optical material, and forms high refractive index portions alternated with low refractive index portions; and the high refractive index portions serve as optical wave guides, and the electro-acoustic transducer easily produces the optical wave guide in the block.

3 Claims, 11 Drawing Sheets

OPTICAL DEVICE HAVING OPTICAL WAVE GUIDE PRODUCED IN THE PRESENCE OF ACOUSTIC STANDING WAVE

This is a continuation of application Ser. No. 08/833,253 filed on Apr. 4, 1997, now U.S. Pat. No. 5,949,572.

FIELD OF THE INVENTION

This invention relates to an optical device and, more particularly, to an optical device having an optical wave guide produced in the presence of acoustic standing wave.

DESCRIPTION OF THE RELATED ART

Figure 1:
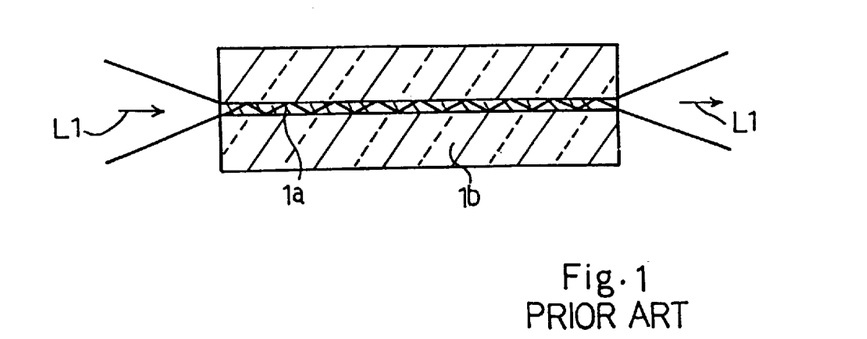
FIG. 1 is a cross sectional view showing the structure of the prior art optical fiber.

A typical example of the optical wave guide is an optical fiber. In order to confine light in the optical fiber, the optical fiber has a multilayer structure shown in FIG. 1. A core 1a is enclosed in a clad 1b, and the core 1a and the clad 1b are, by way of example, formed of quartz glass and compound glass, respectively. The quartz glass is larger in refractive index than the compound glass, and incident light L1 repeats the total reflection on the boundary between the core 1a and the clad 1b. As a result, the light L1 proceeds along the core 1a, and is radiated from the other end. The multilayer structure is achieved by a double crucible pulling down method and so on.

Figure 2:
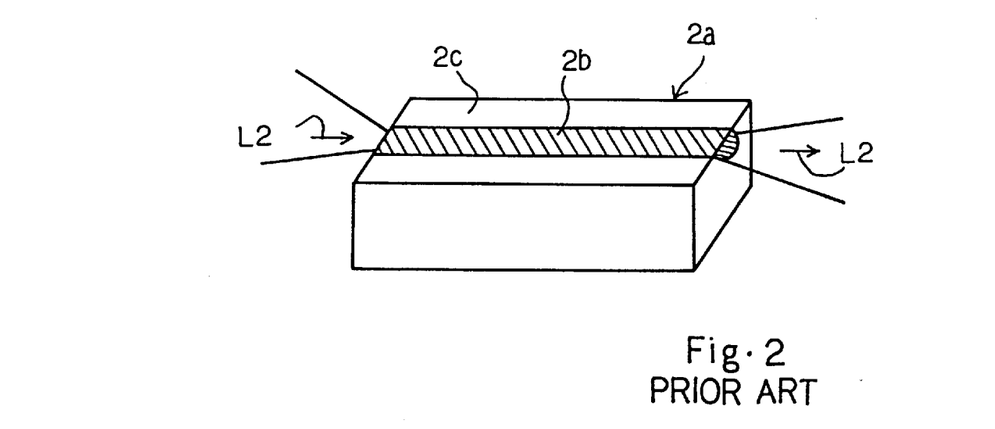
FIG. 2 is a perspective view showing the structure of the prior art thin film wave guide formed of single crystal of LiNbO$_3$.

Another example of the optical wave guide is known as "diffusion type optical wave guide". The diffusion type optical wave guide has an elongated portion with a large refractive index by replacing an element of single crystal material with another element. FIG. 2 illustrates the diffusion type optical wave guide. A piece 2a of single crystal compound of $LiNbO_3$ is available for the diffusion type optical wave guide, and Li-site of the single crystal material is replaced with $H^+$ or $Ti^{3+}$ in an elongated portion 2b indicated by hatching lines. The elongated portion 2b is higher in refractive index than the remaining portion 2e of the single crystal compound, and serves as a wave guide. Incident light L2 is propagated along the elongated portion 2b or the wave guide, and is radiated from the other end.

Figure 3:
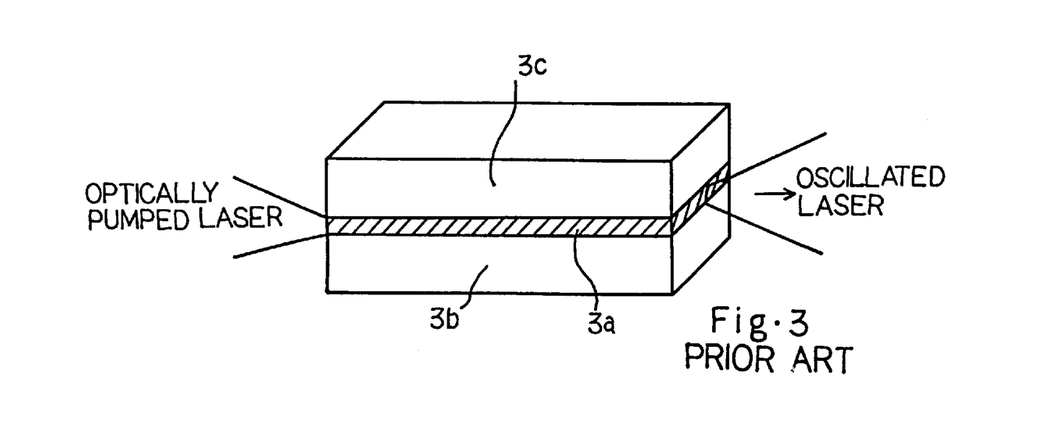
FIG. 3 is a perspective view showing the structure of another prior art thin film wave guide having the plane wave guide grown by using the liquid-phase epitaxy.

Another example of the optical wave guide is illustrated in FIG. 3. The optical wave guide is categorized in the thin film wave guide, and has a plane wave guide of active material grown by using a liquid-phase epitaxy. The thin film wave guide increases the energy density of optically pumped laser light/oscillation light generated in the active material, and, accordingly, improves the oscillation threshold and the slope efficiency or input-and-output characteristics.

FIG. 3 illustrates a thin film wave guide or a planar optical wave guide disclosed by D. Pelenc et. al. in "High slope efficiency and low threshold in a diode-pumped epitaxially grown Yb:YAG wave guide laser", Optics Communications, vol. 115, 1995, pages 491 to 497. A plane wave guide 3a, which is indicated by hatching lines, is sandwiched between Yb-doped YAG 3b and 3c. $Al^{3+}$ site is partially replaced with $Ga^{3+}$, and the active material is epitaxially grown on the Yb-doped YAG substrate 3b so as to form the plane wave guide 3a. Yb-doped YAG with $Ga^{3+}$ is grown on the plane wave guide 3a, and the plane wave guide 3a is overlain by the Yb-doped YAG layer 3c.

Various optical devices have been developed, and several optical devices are known as "acousto-optic device". An interaction between optical material and an acoustic wave is known as an acousto-optic effect, and the acousto-optic effect is available for an optical device.

Figure 4:
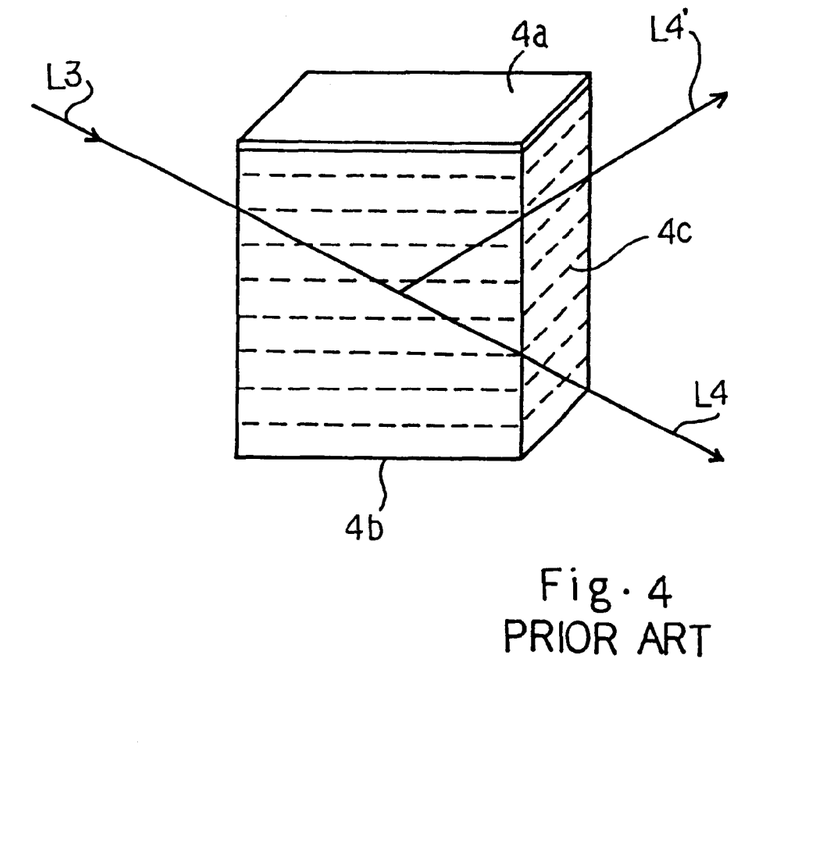
FIG. 4 is a perspective view showing the structure of the prior art optical deflector using the acousto-optic effect.

FIG. 4 illustrates an optical deflector analogous to the electro-acoustic element disclosed in Japanese Patent Publication of Unexamined Application No. 50-143547. The optical deflector has an electro-acoustic transducer 4a attached to a block 4b of optic material. The electro-acoustic transducer 4a generates an ultrasonic wave 4c.

Laser light L3 is obliquely incident onto the block 4b, and is propagated through the block 4b. The transmitted light L4 is radiated from the block 4b. When the electro-acoustic transducer 4a is driven for generation of the ultrasonic wave 4c, Bragg reflection takes place due to the ultrasonic wave 4c due to an interaction between photon and phonon. If the electro-acoustic transducer 4a changes the frequency of the ultrasonic wave 4c, the laser light L3 is diffracted, and is radiated from the block 4b as indicated by L4'.

In this instance, the acoustic wave is applied as a progressive wave. If the acoustic wave does not serve as a progressive wave, the diffraction intensity is drastically decreased, because the interaction between the photon and phonon causes the diffraction to take place.

Figure 5:
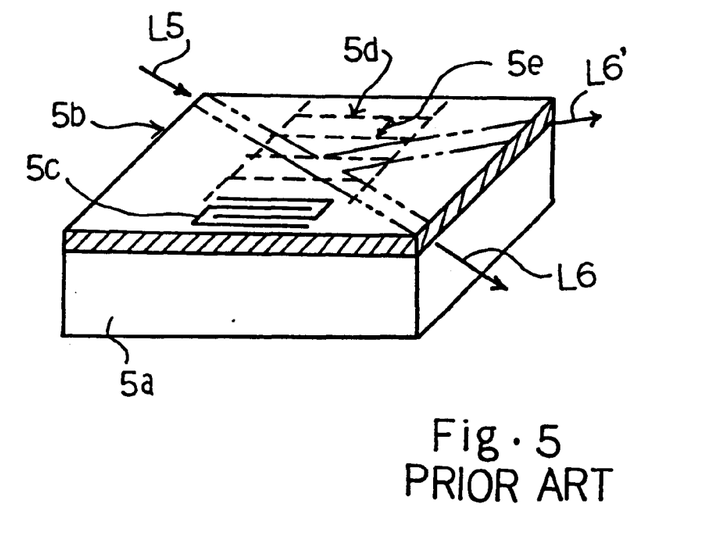
FIG. 5 is a perspective view showing the structure of the prior art optical filter also using the acousto-optic effect.

A surface acoustic wave is also available for an optical device. FIG. 5 illustrates an optical filter for changing the spectrum distribution of an incident laser light L5. The optical filter is analogous to an optical deflector with a comb-like electro-acoustic transducer disclosed in Japanese Patent Publication of Unexamined Application No. 62-257133. The filter comprises a block 5a of optical material, an optical wave guide 5b formed on the block 5a and a comb-like electro-acoustic transducer 5c. The comb-like electro-acoustic transducer 5c generates an ultrasonic wave 5d, and the laser light L5 is propagated in the optical wave guide 5b in such a manner as to cross the ultrasonic wave 5d. The laser light L5 is radiated from the other side as transmitted light L6. However, when the laser light L5 is interfered with the ultrasonic wave 5d, the ultrasonic wave 5d diffracts a predetermined frequency component L6'. If the electro-acoustic transducer 5c varies the intervals 5e of the ultrasonic wave 5d, the filter changes the diffracted frequency component.

The prior art optical wave guide device encounters a problem in the production cost. As described hereinbefore, the optical wave guide requires a refractive index higher than the other portion, and the higher refractive index is achieved by bonding different materials to each other, replacing an element of the optical material with another element, diffusing a dopant into an optical element or using a hetero-epitaxy. These modifying techniques are carried out on a part of the optical material, and a masking step and/or lithography is necessary for the selective modification. This results in a complicated fabrication process. The complicated fabrication process requires various kinds of apparatus such as, for example, a sputtering apparatus, a thin film growing apparatus, an etching apparatus, a cleaning apparatus and an annealing apparatus. Therefore, the prior art optical device with an optical wave guide is so expensive.

The second problem inherent in the prior art optical wave guide is poor reproducibility. A part of the optical material is converted to a high refractive index portion through a chemical reaction, and various parameters dominate the chemical reaction. It is impossible to exactly control all the parameters. For this reason, the reproducibility is poor.

The third problem is that the prior art optical wave guide can not be formed in all the optical materials. Some optical materials do not widely change the refractive index, and the crystal structure of another optical material is destroyed through the selective modification.

SUMMARY OF THE INVENTION

It is therefore an important object of the present invention to provide an optical device which has an optical wave guide inexpensive, reliable and formed in an optical material which is not available for the prior art optical wave guide.

To accomplish the object, the present invention proposes to partially change a refractive index of optical material by using an acoustic standing wave.

In accordance with the present invention, there is provided an optical device comprising a block of optical material, and at least one acoustic wave generator for creating an acoustic wave existing as a standing wave in the block, and the standing wave changes a refractive index of a part of the block through an acousto-optic effect so as to form an optical wave guide in the block.

BRIEF DESCRIPTION OF THE DRAWINGS

The features and advantages of the optical device according to the present invention will be more clearly understood from the following description taken in conjunction with the accompanying drawings in which.

DESCRIPTION OF THE PREFERRED EMBODIMENTS

First Embodiment

Figure 6:
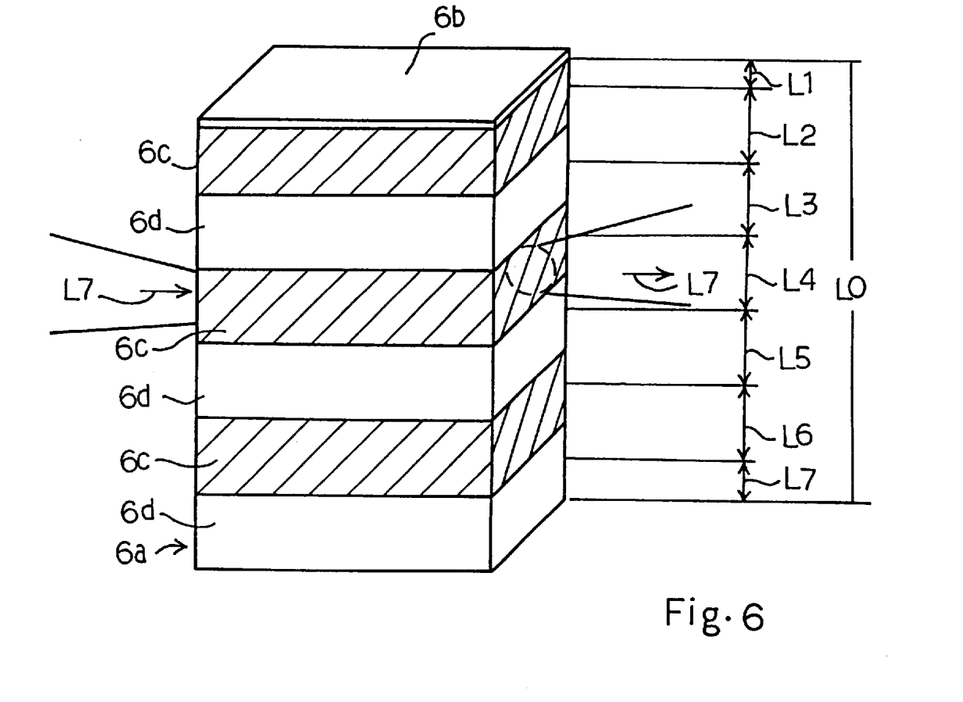
FIG. 6 is a perspective view showing the structure of an optical device according to the present invention.
Figure 7:
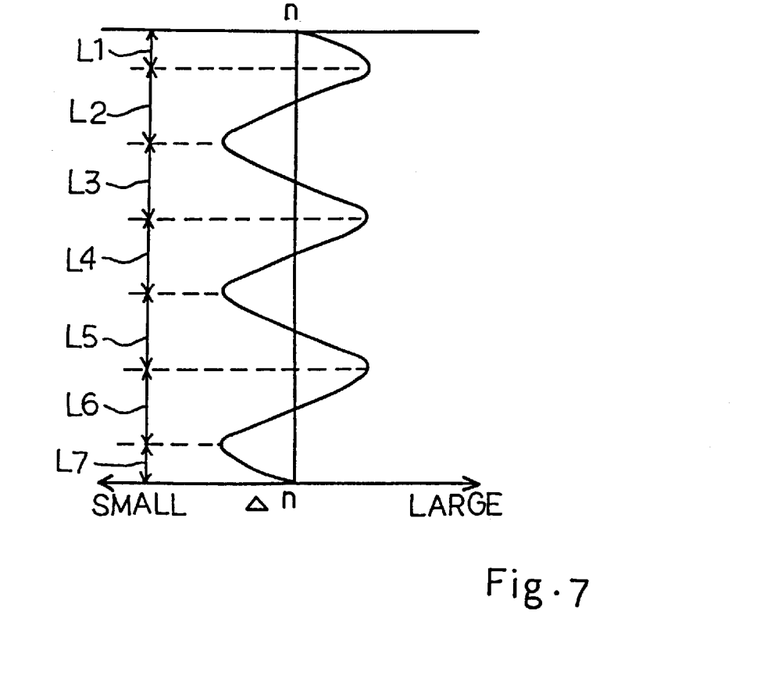
FIG. 7 is a graph showing a distribution of refractive index generated by an acoustic standing wave in the optical device.

Referring to FIG. 6 of the drawings, an optical device embodying the present invention comprises a block 6a of optical material and an electro-acoustic transducer 6b attached to the block 6a. The electro-acoustic transducer 6b generates an acoustic wave, and the acoustic wave is propagated in the block 6a. The block 6a has length L0 equal to a multiple of the wavelength of the acoustic wave, and a standing wave takes place in the block 6a. The standing wave is stable, and creates a distribution of refractive index as shown in FIG. 7. L1 to L7 in FIG. 7 are corresponding to distance L1 to L7 in FIG. 6. The standing wave periodically alternately creates high refractive index portions 6c, which are indicated by hatching lines, and low refractive index portions 6d, and the high refractive index portions 6c are stable in the block 6a. The high refractive index portions 6c and the low refractive index portions 6d are alternately laminated, and the high refractive index portion 6c is available for a planar optical wave guide.

When light L7 is incident on one of the high refractive index portion 6c, the light L7 is propagated through the high refractive index portion 6c, and is radiated from the other end.

The distribution of refractive index is observed in all the optical materials, and, accordingly, there is no limitation on the optical material used for the optical device according to the present invention. The variation delta-n of the refractive index due to the acousto-optic effect is represented by equation 1.

$$\text{delta-n}^2 = \frac{1}{2}(p^2 n^6 / \rho v^3) p \ldots \qquad \text{Equation 1}$$

where P is a strain optical coefficient, n is a refractive index, rho is a density, v is an acoustic velocity, and p is an energy of acoustic wave.

$(p^2 n^6/\text{rho } v^3)$ is known as a figure of merit M, and equation 1 is rewritten as $$\text{delta-n}^2 = M \times p \times \frac{1}{2} \ldots \qquad \text{Equation 2}$$

The values of the figure of merit M for various optical materials are, by way of example, taught by Amnon Yariv in "Fundamentals of Opto-electronics", page 330. The values of the figure of merit are also taught by Ogawa et al. in "Crystal Physics and Enginnering".

As will be seen in equation 2, the square of the difference of the refractive index between the high refractive index portion 6c and the low refractive index portion 6d is proportional to the product of the figure of merit M and the intensity of the acoustic wave p, and an optical material with a large figure of merit M achieves a large difference of the refractive index delta-n between the high refractive index portion 6c and the low refractive index portion 6d. When the difference of the refractive index is of the order of $10^{-3}$, the high refractive index portion 6c is available for a planar optical wave guide. Even if an optical material has a relatively small figure of merit M, a large input power of the acoustic wave achieves the difference of refractive index delta-n of the order of $10^{-3}$.

For example, assuming now that the block 6a is formed of LiNbO$_3$, which is used for an optical switch and an optical wavelength converting element, the figure of merit M is 7.0 ($\times 10^{-18}$ s$^3$/g). If the electro-acoustic transducer 6b supplies the acoustic wave at 1 kilo-watt/mm$^2$. The energy density of the acoustic wave is $1 \times 10^9$ watt/m$^2 = 1 \times 10^{12}$ g/s$^3$. Substituting these values for M and p in equation 2.

delta-n$^2 = 1/2 \times (7.0 \times 10^{-18}) \times (1 \times 10^{12})$ Then, delta-n is 1.8$\times 10^{-3}$, and the high refractive index portion 6c is available for the planar optical wave guide.

On the other hand, if the block 6a is formed of $PbMoO_4$ or $TeO_2$ available for an optical deflector, the figure of merit M is 73 for $PbMoO_4$ and 793 for $TeO_2$. Therefore, the planar optical wave guide is created in the block 6a under the acoustic wave energy of 100 watts and 10 watts, respectively.

As will be appreciated from the foregoing description, the acoustic standing wave alternately creates the high refractive index portions 6c serving as an optical wave guide and the low refractive index portions 6d in the block 6a of optical material, and a selective replacement of an element and a selective diffusion are not required for the optical wave guide. The location of the high refractive index portion is determined by the length L0 and the wavelength of the acoustic wave, and is reproducible. For this reason, the optical device according to the present invention is inexpensive and reliable. Finally, the acousto-optic effect is observed in all the optical materials. Even if an optical material has a relatively small figure of merit, the optical wave guide is created in the optical material by increasing the input power of the electro-acoustic transducer 6b.

Second Embodiment

Figure 8:
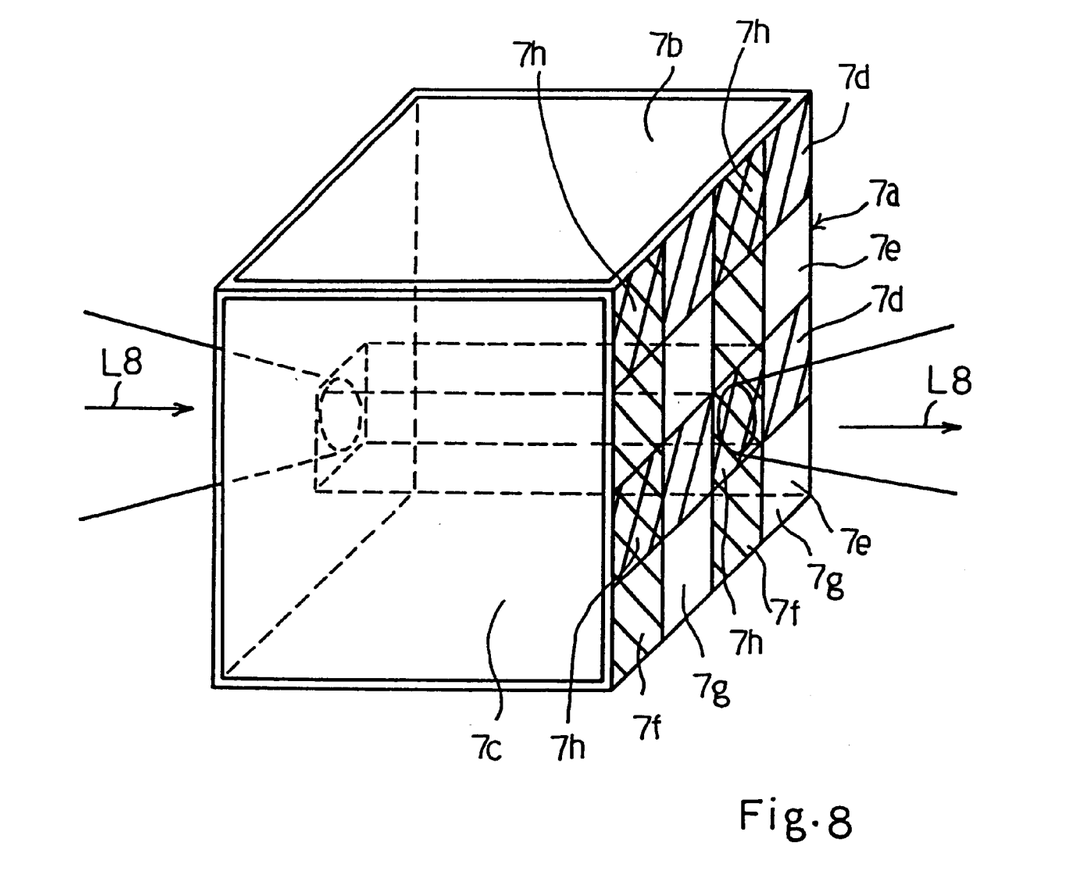
FIG. 8 is a perspective view showing the structure of another optical device according to the present invention.

Turning to FIG. 8 of the drawings, another optical device embodying the present invention comprises a cubic block 7a of optical material and electro-acoustic transducers 7b and 7c attached to two surfaces of the cubic block 7a perpendicular to each other. The electro-acoustic transducer 7b creates a first acoustic standing wave, and the first acoustic standing wave causes first high refractive index portions 7d to alternate with first low refractive index portions 7e. The first high refractive index portions 7d are indicated by hatching lines downwardly drawn from the right side to the left side. On the other hand, the other electro-acoustic transducer 7c creates a second acoustic standing wave in a perpendicular direction to that of the first acoustic standing wave. The second acoustic standing wave causes second high refractive index portions 7f to alternate with second low refractive index portions 7g. The second high refractive index portions 7f are indicated by hatching lines downwardly drawn from the left side to the right side.

The first high refractive index portions 7d and the second high refractive index portions 7f form intersections 7h indicated by both hatching lines, and the intersections 7h serve as quasi-one dimensional optical wave guides. When light L8 is incident onto one of the quasi-one dimensional optical wave guide 7h, the light is propagated through the quasi-one dimensional optical wave guide without a diffusion, and is radiated from the other side.

Although the cubic block 7a is used for the optical device, it is not necessary for the optical device to have one length measured in the perpendicular direction to the electro-acoustic transducer 7b equal to the other length measured in the perpendicular direction to the other electro-acoustic transducer 7c. The one length may and the other length may be equal to one multiple of the wavelength and another multiple of the wavelength different from each other.

The optical device shown in FIG. 8 is also inexpensive and reliable, and most of the optical materials are available for the optical device.

EXAMPLES

The optical device shown in FIG. 6 and the optical device shown in FIG. 8 are two kinds of basic structure of the optical device according to the present invention. Various kinds of optical devices are fabricated on the basis of the two kinds of basic structure as follows.

First Example

Figure 9:
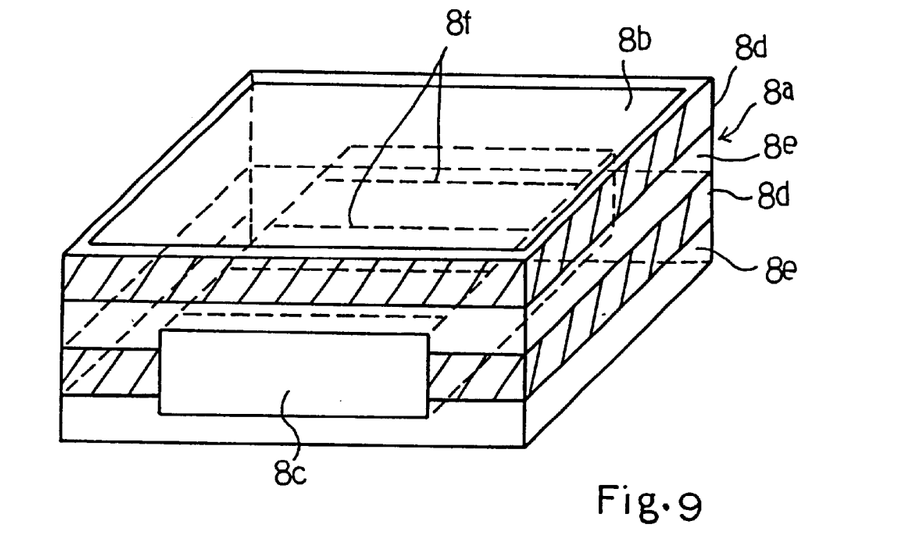
FIG. 9 is a perspective view showing the structure of an optical deflector according to the present invention.
Figure 10:
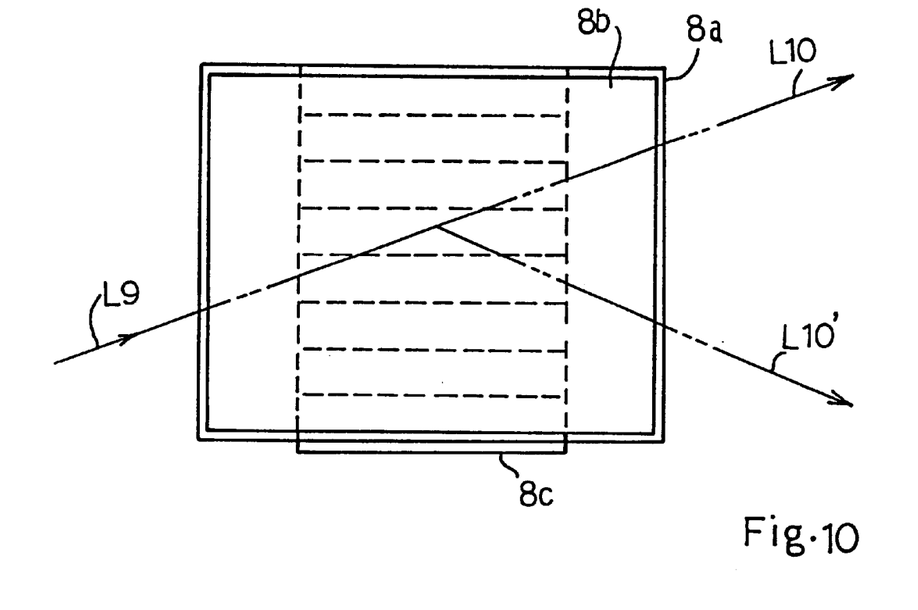
FIG. 10 is a plan view showing a deflection of laser light incident into the optical deflector.

FIGS. 9 and 10 illustrate an optical deflector. The optical deflector comprises a block 8a of optical material, a first electro-acoustic transducer 8b attached to an upper surface of the block 8a and a second electro-acoustic transducer 8c attached to a side surface of the block 8a. The first electro-acoustic transducer 8b generates a first acoustic wave, and the first acoustic wave is supplied to the block 8a. The block 8a has a height equal to a multiple of the wavelength of the first acoustic wave, and a standing wave takes place in the direction of the height. The standing wave periodically changes the refractive index of the block 8a, and high refractive index portions 8d are alternated with low refractive index portions 8e. The high refractive index portions 8d are indicated by hatching lines.

The second electro-acoustic transducer 8c is aligned with one of the high refractive index portions 8d serving as a planar optical wave guide, and generates a second acoustic wave 8f. A progressive wave takes place in a perpendicular direction to that of the standing wave. When laser light L9 is incident onto the planar optical wave guide 8d, the laser light L9 is propagated through the planar optical wave guide 8d, and laser light L10 is radiated from the other side. However, when the second electro-acoustic transducer 8c changes the frequency of the second acoustic wave, the progressive wave causes the laser light L9 to change the direction due to Bragg reflection, and laser light L10' is radiated from the other side as shown in FIG. 10.

The present inventor formed the block 8a of $PbMoO_4$, and the first and second electro-acoustic transducers 8b and 8c are attached to the upper surface and the side surface of the block 8a as shown in FIGS. 9 and 10. The first electro-acoustic transducer 8b generated the first ultrasonic wave at 30 MHz, and the wavelength was 100 microns. The height of the block 8a was regulated to a multiple of 100 microns, and the distribution of refractive index was repeated at intervals of 100 microns.

The present inventor confirmed the following phenomena. While the second electro-acoustic transducer 8c was standing idle, the incident laser light L9 straightly proceeded, and the laser light L10 was radiated from the other side. When the Bragg condition were satisfied, the incident laser light L9 was deflected, and the laser light L10' was radiated from the other side.

Second Example

Figure 11:
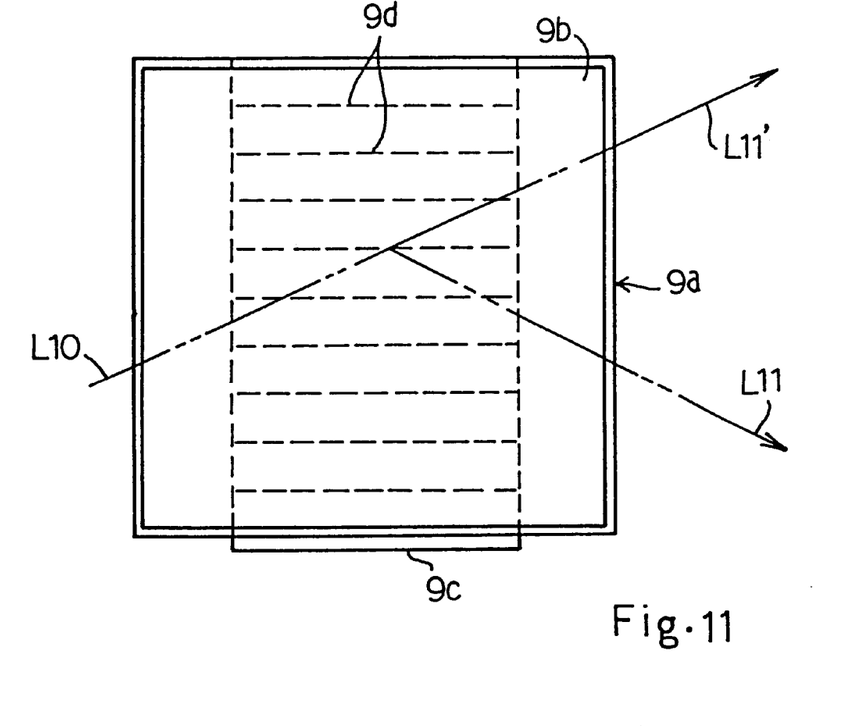
FIG. 11 is a plan view showing a frequency filtration achieved by an optical filter according to the present invention.

An optical frequency filter according to the present invention is similar in structure to the optical deflector shown in FIG. 9, and comprises a block 9a of optical material, a first electro-acoustic transducer 9b attached to an upper surface of the block 9a and a second electro-acoustic transducer 9c attached to a side surface of the block 9a as shown in FIG. 11. The height of the block 9a is equal to a multiple of the wavelength of an acoustic wave generated by the first electro-acoustic transducer 9b. Therefore, the acoustic wave exists as an acoustic standing wave, and the acoustic standing wave creates high refractive index portions and low refractive index portions in the block 9a. The high refractive index portions are alternated with the low refractive index portions, and the second electro-acoustic transducer 9c is aligned with one of the high refractive index portions serving as an optical wave guide. The second electro-acoustic transducer 9c generates ultrasonic, and the ultrasonic exists as a progressive wave 9d.

Assuming now that light components different in wavelength form an optical beam L10, the light beam L10 is incident into the optical wave guide, and is propagated along the optical wave guide. A light component satisfies the Bragg condition, and is diffracted as indicated by dots-and-dash line L11. However, the other light components L11' do not satisfy the Bragg condition, and are radiated from the other side.

The present inventor fabricated the optical frequency filter shown in FIG. 11, and the block 9a was formed of $MoPbO_4$. The present inventor changed the frequency of the progressive wave, and measured the wavelength of the diffracted light component L11. The present inventor confirmed that the diffracted light component L11 satisfied the Bragg condition.

Third Example

The present invention is applied to a nonlinear optical wave guide. Nonlinear optical material is available for a wavelength conversion device. When increasing the energy density of incident laser light, the conversion efficiency is enhanced. For this reason, the incident laser light L12 is usually focused by using a lens unit (not shown), and a high energy density zone 10a takes place in the nonlinear optical wave guide (see FIG. 12). However, the other zone is not so high in the energy density. This results in that only a small part of the nonlinear optical wave guide is used for the wavelength converter.

Figure 12:
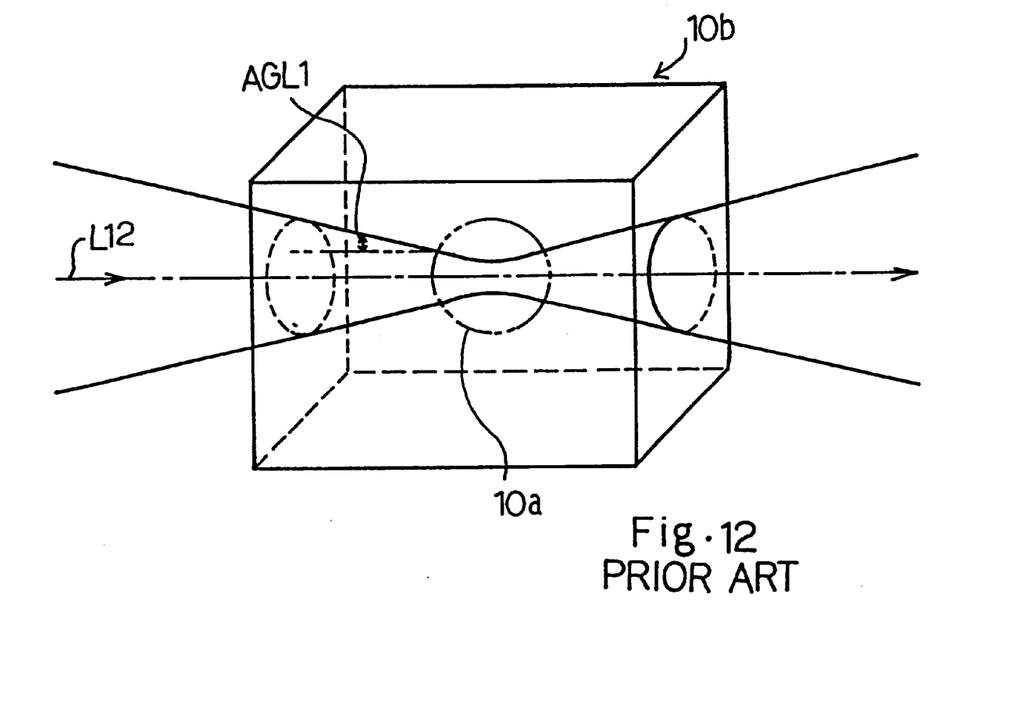
FIG. 12 is a perspective view showing the structure of a prior art nonlinear optical element.

When an angular phase matching technique is used, an angular mis-alignment takes place, and angle AGL1 makes the fundamental wave and the harmonics different in phase. For this reason, it is preferable for the incident laser light L12 to be propagated as a parallel light.

Figure 13:
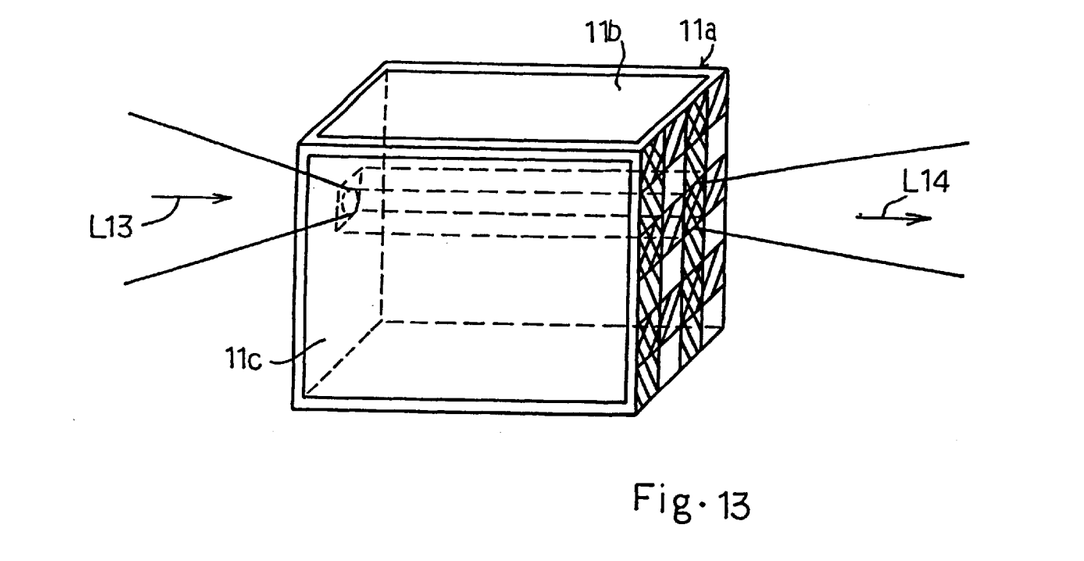
FIG. 13 is a perspective view showing the structure of a nonlinear optical element according to the present invention.

FIG. 13 illustrates a wavelength conversion device formed of nonlinear optical material and embodying the present invention. The wavelength conversion device comprises a block 11a of nonlinear optical material, a first electro-acoustic transducer 11b attached to the upper surface of the block 11a and a second electro-acoustic transducer 11c attached to a side surface of the block 11a.

A bulk of nonlinear optical material (not shown) is cut into the block 11a under the angular phase matching condition. The first electro-acoustic transducer 11b generates a first acoustic wave, and the block 11a has a height equal to a multiple of the wavelength of the first acoustic wave. The second electro-acoustic transducer 11c also generates a second acoustic wave, and the block 11a has a width equal to another multiple of the wavelength of the second acoustic wave. The first acoustic wave exist as a first standing wave, and high refractive index portions and low refractive index portions alternately take place in the direction of the height. Similarly, the second acoustic wave exists as a second standing wave, and high refractive index portions are alternated with low refractive index portions in the direction of the width. The high refractive index portions due to the first standing wave are indicated by hatching lines downwardly drawn from the right side to the left side in FIG. 13. On the other hand, the high refractive index portions due to the second standing wave are indicated by hatching lines downwardly drawn from the left side to the right side in FIG. 13. The high refractive index portions due to the first standing wave are intersected with the high refractive index portions due to the second standing wave, and the intersections serve as quasi-one dimensional optical wave guides.

Assuming now that a lens unit (not shown) focuses a laser light beam L13 upon one of the quasi-one dimensional optical wave guide, the quasi-one dimensional optical wave guide propagates the laser beam L13 without diffusion, and the laser beam L13 is assumed to be a parallel light in the quasi-one dimensional optical wave guide. Therefore, the laser beam L13 maintains the high energy density over the quasi-one dimensional optical wave guide, and the wavelength of the laser beam L13 is effectively converted to a light beam L14 with a different wavelength.

The present inventor fabricated the optical wavelength converter shown in FIG. 13. The block 11a was formed of $Li_2B_4O_7$. $Li_2B_4O_7$ can convert the wavelength until the ultra-violet region. The wavelength converter was expected to convert the second harmonic of YAG laser at 532 millimeters to FHG light at 266 millimeters, and a bulk of $Li_2B_4O_7$ was cut at AGL1=45 degrees for the angular phase matching. The first electro-acoustic transducer 11b and the second electro-acoustic transducer 11c are bonded to the upper and the side surfaces of the block 11a. The first electro-acoustic transducer 11b and the second electro-acoustic transducer 11c may be attached to the upper and side surfaces by using a sputtering.

The acoustic velocity is 5000 meters per second in the crystal of $Li_2B_4O_7$, and the first and second electro-acoustic transducers 11b/11c oscillated at 5 MHz. Then, the change of refractive index took place at intervals of 100 microns. The first and second electro-acoustic transducers 11b and 11c were driven at 1 kilo-watt for generation of the first and second acoustic waves, and the high refractive index portion was larger in refractive index than the low refractive index portion by 3 to 10. The quasi-optical wave guide was 15 millimeters long.

The present inventor further fabricated the prior art optical wavelength converter shown in FIG. 12. The same nonlinear optical material was used, and the prior art optical wavelength converter was also expected to convert the second harmonic of the YAG laser to the FHG light beam.

A lens unit (not shown) was provided between the YAG laser source (not shown) and the optical wavelength converters shown in FIGS. 12 and 13, and had a focal length of 100 millimeters. The incident laser beam L13 had a diameter of the order of 50 microns at the focal point.

The YAG laser source radiated the laser light at 10Hz, and the power of the second harmonic of 532 nanometer wavelength was averaged at 8 milli-watt for 10 nano-second. The optical wavelength converter according to the present invention radiated the FHG light beam of 266 nanometer wavelength at 1 milli-watt. On the other hand, the prior art optical wavelength converter radiated the FHG light beam at 100 micro-watt. Thus, the optical wavelength converter according to the present invention achieved the high converting efficiency ten times larger than that of the prior art optical wavelength converter.

The present inventor further fabricated the optical wavelength converter of another nonlinear optical material, and confirmed the improvement of the converting efficiency.

Fourth Example

While a laser diode is being excited through an optical pumping, an optical resonator increases the energy density of the excited/oscillated light. The increase of energy density results in a decrease of an oscillation threshold, and an increase of the slope efficiency. Especially, in case of three-level laser oscillation, these phenomena are appreciated, because the oscillation threshold is high.

Figure 14:
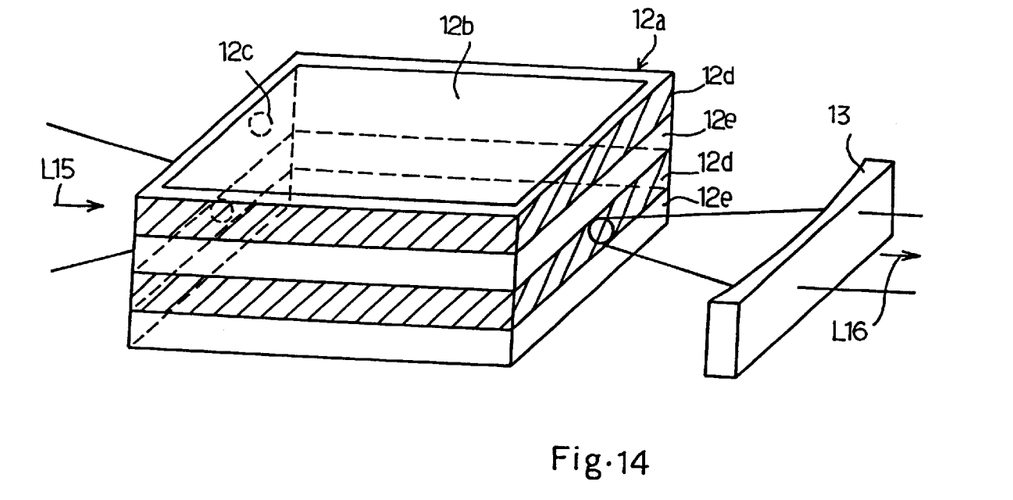
FIG. 14 is a perspective view showing the structure of a solid-state laser oscillator according to the present invention.

FIG. 14 illustrates a laser oscillator embodying the present invention. The laser oscillator comprises a block 12a of Yb-doped $YVO_4$, an electro-acoustic transducer 12b attached to an upper surface of the block 12a and Ar coating/HR coating 12c for a laser diode/oscillated laser light. Yb-doped YVO$_4$ is a three level laser oscillating material, and has a high oscillation threshold, and Yb absorbs the light component of 900 nanometer wavelength.

The acoustic velocity is 5000 meters per second in the crystal of YVO$_4$, and the electro-acoustic transducer 12b generates an acoustic wave at 100 MHz. The block 12a has a height equal to a multiple of the wavelength of the acoustic wave. The acoustic wave exists as a standing wave, and high refractive index portions 12d and low refractive index portions 12e alternately take place in the block 12a. The high refractive index portions 12d are indicated by hatching lines, and serve as optical wave guide of 50 microns thick. A part of oscillated light L16 is taken out from the opposite side surface through an output mirror 13.

When a laser diode radiates excited laser light L15 to one of the high refractive index portions 12d, the excited laser light/oscillated laser light L15/L16 are confined in the high refractive index portion 12d, and the energy density increases. The laser oscillator is continuously oscillating, and the absorption efficiency and the luminous efficiency are improved.

The present inventor fabricated the laser oscillator described hereinbefore, and the laser diode is excited at 500 milli-watt. The laser oscillator achieved an output of 1.03 micron oscillation light at 50 milli-watt.

The present inventor confirmed the same effects by using other laser materials.

Fifth Embodiment

Figure 15:
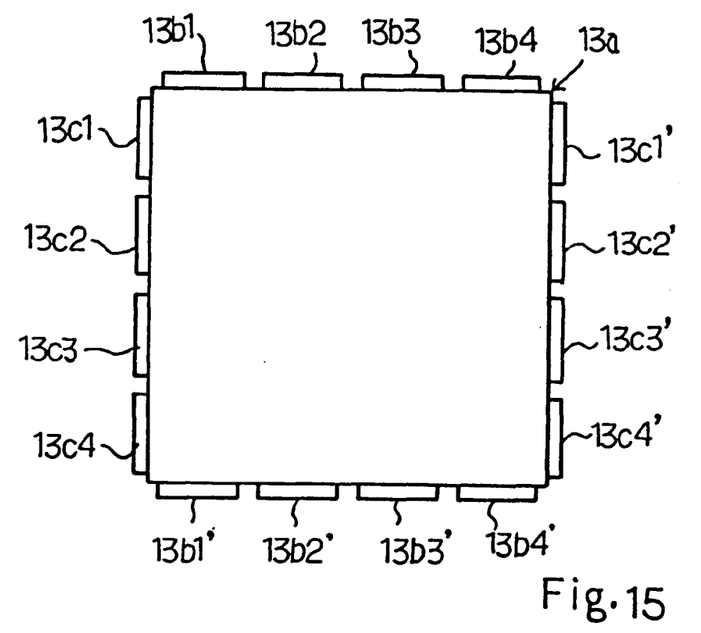
FIG. 15 is a front view showing an optical switch according to the present invention.
Figure 16:
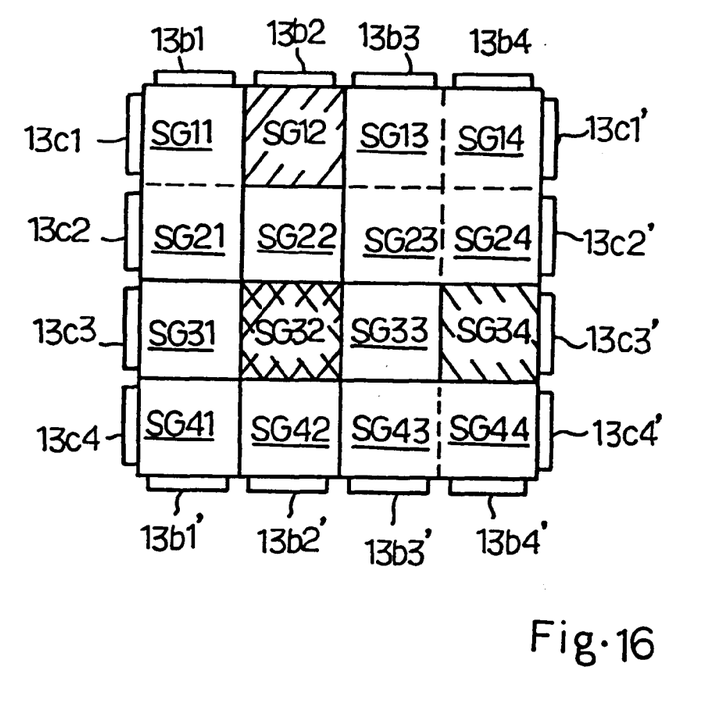
FIG. 16 is a front view showing a quasi-one dimensional optical wave guide of the optical switch.

FIG. 15 illustrates an optical switch embodying the present invention. The optical switch comprises a block 13a of optical material, first electro-acoustic transducers 13b1/13b1', 13b2/13b2', 13b3/13b3' and 13b4/13b4' attached to upper/lower surfaces of the block 13a and second electro-acoustic transducers 13c1/13c1', 13c2/13c2', 13c3/13c3' and 13c4/13c4' attached to the side surfaces of the block 13a. The dimensions of the block 13a are adjusted in such a manner that the first and second electro-acoustic transducers 13b1/13b1' to 13b4/13b4' and 13c1/13c1' to 13c4/13c4' generate standing waves in the directions perpendicular to each other. The first electro-acoustic transducers 13b1/13b1' to 13b4/13b4' and the second electro-acoustic transducers 13c1/13c1' to 13c4/13c4' define a matrix of segments SG11, . . . , SG14, . . . and SG41, . . . SG44 in the block 13a as shown in FIG. 16, and each segment SG11 to SG44 extends between a front surface to the rear surface of the block 13a. High refractive index portions are aligned with the center lines of the segments SG11 to SG44, and quasi-on dimensional optical wave guides selectively take place in the segments SG11 to SG44.

When the first electro-acoustic transducer 13b2 and the second electro-acoustic transducer 13c3' are driven for generating the standing waves, the first electro-acoustic transducer 13b2 and the second electro-acoustic transducer 13c3' create the high refractive index portions indicated by hatching lines downwardly drawn from the right side to the left side and the high refractive index portions indicated by hatching lines downwardly drawn from the left side to the right side, and the quasi-one dimensional optical wave guide takes place in the segment SG32.

Figure 17:
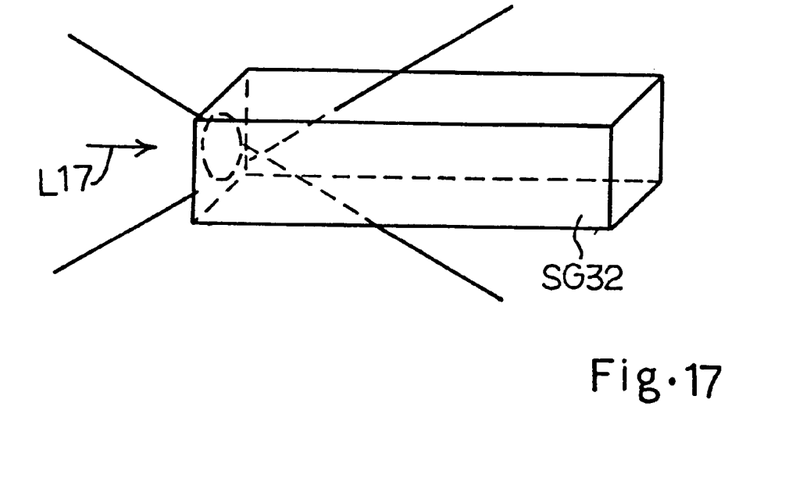
FIG. 17 is a perspective view showing a segment where no quasi-one dimensional optical wave guide does not take place.
Figure 18:
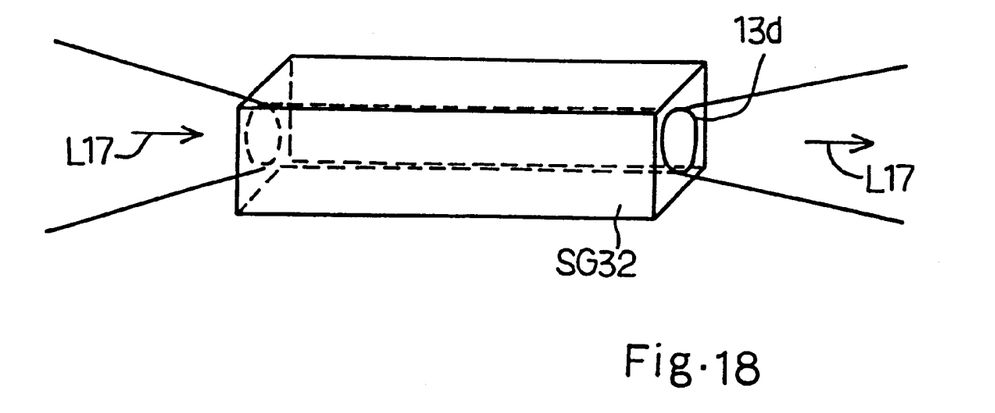
FIG. 18 is a perspective view showing another segment where the quasi-one dimensional optical wave guide takes place.

While the quasi-one dimensional optical wave guide is not being formed in the segment SG32, an incident laser light beam L17 focused on the segment SG32 is diffused as shown in FIG. 17, and the laser light beam L17 is never radiated from the other end. On the other hand, when the quasi-one-dimensional optical wave guide 13d is produced in the segment SG32, the laser beam L17 is propagated through the quasi-one dimensional optical wave guide 13d, and is radiated from the other end as shown in FIG. 18.

Figure 19:
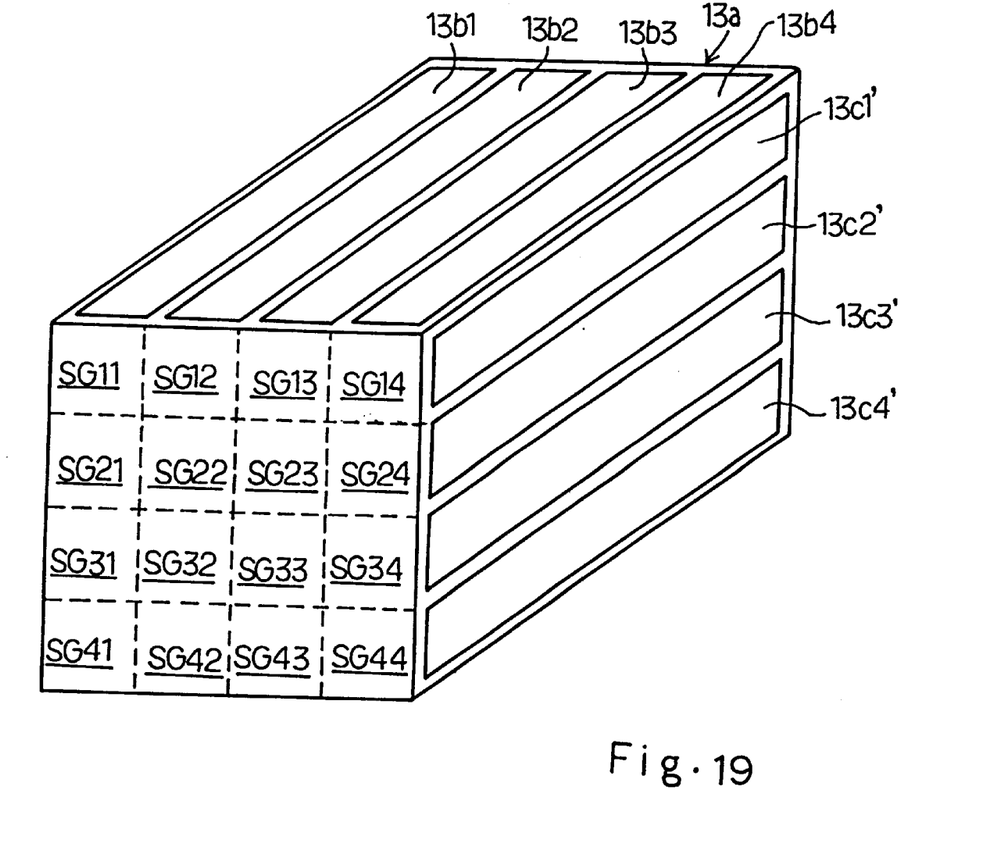
FIG. 19 is a perspective view showing the structure of an optical switch fabricated by the present inventor.

The present inventor fabricated the optical switch shown in FIG. 19. The block 13a was formed of Te glass. Te glass had a large acousto-optical figure of merit of the order of 30, and was optically isotropic. The block 13a had the front and rear surfaces measured by 4 millimeters×4 millimeters, and the front surface was spaced from the rear surface by 30 millimeters. The acoustic velocity was 3400 meters per second in Te glass, and the first electro-acoustic transducers 13b1/13b1' to 13b4/13b4' and the second electro-acoustic transducers 13c1/13c1' to 13c4/13c4' were driven at 3.4 MHz. The quasi-one dimensional optical wave guides were selectively formed in the segments SG11 to SG44 of 1 millimeter square.

A micro-lens unit (not shown) was provided between a laser diode (not shown) and the optical switch, and the micro-lens unit focused the laser light on the central zones of the segments SG11 to SG44. The present inventor confirmed a switching action of the 4×4 optical switch.

Although particular embodiments of the present invention have been shown and described, it will be obvious to those skilled in the art that various changes and modifications may be made without departing from the spirit and scope of the present invention.

For example, the number of electro-acoustic transducers may be different from those of the examples, and the first to fifth examples do not limit the dimensions of the optical devices according to the present invention.

What is claimed is:

1. An optical device comprising a block of optical material, and at least one acoustic wave generator which forms an optical wave guide in said block by creating an acoustic wave in said block, wherein said acoustic wave is a standing wave changing a refractive index of a part of said block through an acousto-optic effect so as to form said optical wave guide in said block.

2. An optical device comprising a block of optical material, and at least one acoustic wave generator which forms an optical wave guide in said block by creating an acoustic wave in said block, wherein said acoustic wave is a standing wave changing a refractive index of a part of said block through an acousto-optic effect so as to form said optical wave guide in said block, said optical wave guide is a planar optical wave guide substantially perpendicular to said standing wave.

3. The optical device as set forth in claim 1, in which said block is formed of a nonlinear optical material.

* * * * *